United States Patent Office 2,888,994
Patented June 2, 1959

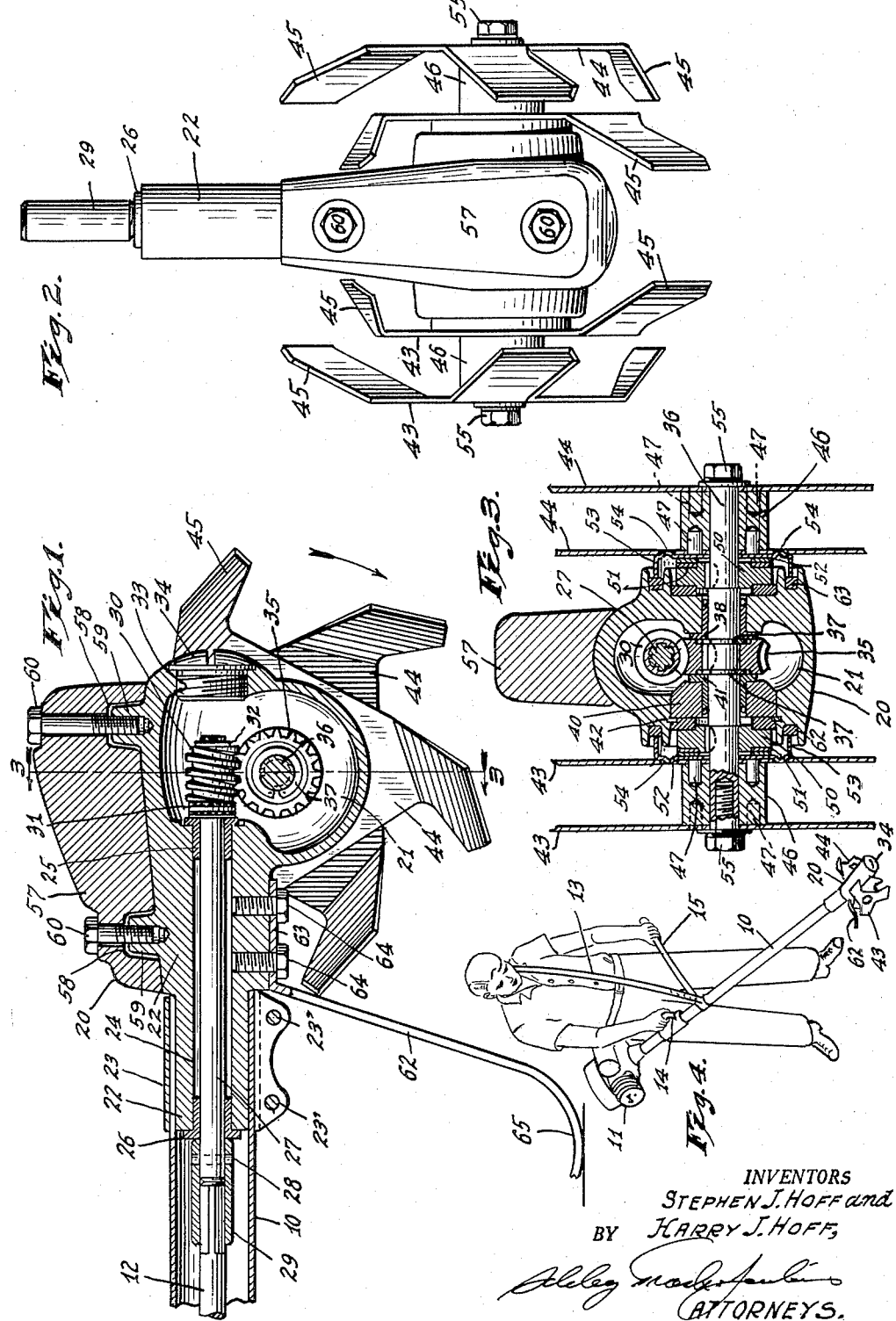

2,888,994

CULTIVATING IMPLEMENT

Harry J. Hoff and Stephen J. Hoff, Richmond, Ind., assignors to Hoffco, Inc., Richmond, Ind., a corporation of Indiana Application October 6, 1955, Serial No. 538,854

3 Claims. (Cl. 172—103)

This invention relates to an earth cultivating implement constructed for use as an attachment to a machine of the general type which comprises a light-weight internal combustion engine mounted at one end of an elongated torque tube and operatively connected through a releasable clutch to a power-transmission shaft extending longitudinally through such tube. The machine is provided with a strap by which it may be slung from the shoulder of an operator to be supported with the torque tube extending forwardly and downwardly from the engine, and the tube is provided with handles to permit the operator to manipulate and guide a power-driven implement mounted on the lower end of the tube.

The particular attachment to which this application is directed comprises a housing adapted to be mounted rigidly on the lower end of the tube. Such housing supports a drive shaft disposed in alignment with the transmission shaft inside the tube and operatively connected to such transmission shaft. Within the housing, the drive shaft is operatively connected through gearing with a transverse, horizontally extending shaft, which projects from opposite sides of the housing. The projecting ends of the driven shaft support rotary cultivating implements which are drivingly connected to the driven shaft through friction clutch means adapted to slip when subjected to torque greater than a predetermined maximum torque. In general, this application is primarily concerned with the manner in which the various operative elements of the attachment are assembled.

In the accompanying drawing, which illustrates the invention:

Fig. 1 is a vertical section through the attachment in the plane of the drive shaft;

Fig. 2 is a plan view of the attachment;

Fig. 3 is a transverse section on the line 3—3 of Fig. 1; and

Fig. 4 is a perspective view illustrating the attachment applied to the operator-carried machine.

As indicated in Fig. 4, the machine in conjunction with which our attachment is intended for use comprises an elongated torque tube 10 on one end of which there is mounted a lightweight internal combustion engine 11 or other source of power. A power-transmitting shaft 12 (Fig. 1) extends through the tube 10 and is operatively connected at one end to the engine 11 through an appropriate clutch, preferably a speed-responsive clutch. To enable the operator to support the weight of the machine, we provide a sling in the form of a strap 13 of adjustable length having its ends connected to spaced points on the assembly of tube 10 and engine 11, and to enable the operator to manipulate and guide a driven attachment secured to the lower end of the tube 10 such tube is provided with handles 14 and 15.

The attachment with which our present application is concerned comprises a housing 20 having an interior cavity 21 and a cylindrical pilot portion 22 for telescopic association with the lower end of the tube 10. As shown, the pilot 22 fits within the tube 10, and a clamp collar 23, tightened by bolts 23', collapses the end of the tube 12 into gripping engagement with the pilot 22.

Extending axially through the pilot 22 and into the cavity 21 is a hole 24 receiving at its inner and outer ends bearing bushings 25 and 26 for rotatably supporting a drive shaft 27. The drive shaft projects beyond the bushings 25, 26 and its outer end is rigidly connected, as by a cross pin 28, to a coupling sleeve 29 which is internally splined for reception of the splined lower end of the shaft 12.

The inner end of the shaft 27 is splined and drivingly received in a worm 30 between which and the bearing bushing 25 an antifriction bearing 31 is desirably interposed. The worm 30 may be releasably retained on the inner end of the shaft 27 by a split spring ring 32 which is received in an annular groove adjacent the end of the shaft and which engages the end face of the worm. In line with the worm 30, the wall of the housing 20 is provided with a screw-threaded opening 33 large enough to pass the bearings 25 and 31 and the worm 30 and to permit access of a tool by which the ring 32 can be expanded to enable its application or removal. A screw-threaded plug 34 serves as a closure for the opening 33.

The worm 30 meshes with a worm gear 35 rigidly mounted at the center of a transverse shaft 36 rotatably supported from the housing 20. As shown, the worm gear is keyed to the shaft 36 and is located axially thereof by two split spring rings 37 which are received in annular grooves in the shaft and in counterbores in the opposite faces of the gear 35. One of the two walls of the housing 20 through which the shaft 36 passes is provided with an opening which receives, with a press fit, a flanged bearing bushing 38 the flange of which engages the adjacent face of the worm gear 35. The opposite wall of the housing is provided with a cylindrical opening large enough to pass the worm gear 35, and in such opening there is received, with a press fit, a bearing support 40. A flanged bearing bushing 41 rotatably receiving the shaft 36 is press-fitted into the support 40 from the inner face thereof so that its flange may engage the adjacent face of the worm gear 35. At the outer face of the support 40, the housing-opening which receives it is provided with an annular groove which receives a split spring ring 42 serving to locate the support 40 and the shaft 36 in a manner which will be described hereinafter.

Mounted on the projecting ends of the shaft 36 are rotary cultivating elements. As shown, a pair of such cultivating elements are mounted in spaced relation on the shaft 36 at each side of the housing 20, one pair of elements being designated 43 in the drawing and the pair 44. Each of the cutting elements is conveniently formed of sheet metal and provided with an annular series of teeth 45, shown as three in number, which are bent out of the plane of the central portion of the cutting implement to project obliquely inwardly or toward the housing 20. Desirably, the bending of the teeth is done on oblique lines to impart to each tooth a rake such as will tend to cause the elements to dig into the ground as they rotate. The two on each side of the housing are conveniently identical to each other and of opposite hand to the two on the other side of the housing. The two cultivating implements of each pair are interconnected for joint rotation through a collar 46 provided at its opposite ends with axially projecting pins 47 received in holes in the interconnected coupling elements. Each of the units consisting of a pair of cultivating elements 43 or 44 and the associated spacing collar 46 is freely rotatable on the shaft 36 except as it is drivingly connected thereto through the friction clutch mechanism now to be described.

Each of the clutch mechanisms just referred to includes a driving-disk 50 rigidly secured to the shaft 36 within a counterbore on the outer face of the housing 20. As shown, each of the drive-disks 50 has a press fit on the end portion of the shaft 36, is keyed thereto, and is located in an axial position determined by its engagement with an outwardly presented shoulder on the shaft. A washer 51 of clutch-facing material engages the outer face of each drive-disk 50, and the outer face of the washer 51 is in turn engaged by a washer 52 of soft rubber or similar compressible materials. Lying between the compressible washer 52 and the inner of the two cultivating elements is the wall of a cup-like sheet metal stamping 53 having outwardly struck bosses 54 received in openings in the adjacent cultivating element. As a result of the driving connection provided by the bosses 54, the cultivating unit on each end of the shaft 36 can be driven by torque transmitted between the frictionally engaging faces of the drive-disk 50 and the washer 51.

To force the washer 51 against the face of the drive disk 50, whereby to create friction necessary to rotate the cultivating elements, the ends of the shaft 36 are drilled and tapped for the reception of screws 55 which bear against the outermost cultivating implement and force it inwardly to compress the compressible washer 52 and force the washer 51 into frictional engagement with the drive-disk 50. By appropriate adjustment of the screws 55, it is possible to control the maximum torque which can be transmitted through each clutch 50—51, thus preventing injury to the implement or stalling of the engine should the cultivating elements encounter an obstacle preventing their free rotation.

If necessary to counterbalance the engine 11 or to provide adequate weight on the cultivating implement for other purposes, I may secure a weight 57 to the upper side of the housing 20. As shown, such weight is located on the housing by recesses 58 provided in its lower surface in position to receive bosses 59 extending upwardly from the housing 20. Screws 60 extending through the weight and into the bosses 59 secure the weight in place.

To limit the depth to which the cultivating elements may enter the ground, it may be desirable to provide the skid 62 shown in Fig. 1. Such a skid may be formed of metal stock which has an end portion 63 secured to the lower face of the housing by screws 64 and which projects generally downwardly to terminate in a rearwardly curved ground-engaging portion 65.

In assembling the housing and cross-shaft 36, the worm gear 35 is first applied to the shaft 36 and located axially thereof by the split spring rings 37. The bushing 38 is slid onto the right-hand end of the shaft, and the previously assembled bushing 41 and bearing support 40 are slid over the left-hand end of the shaft. The shaft is then inserted into the housing 20 from the left, the bushing 38 and the bearing support 40 being forced into the bores which respectively receive them by pressure applied to the support 40. The parts are so dimensioned that with the support 40 forced inwardly to the limit determined by the thickness of the worm 35 and the thickness of the flanges on the bushings 38 and 41 the outer face of the support 40 will clear the groove provided for the reception of the split spring ring 42. The ring 42 is then inserted, and a leftward effort is applied to the right-hand end of the shaft 36 to force it inwardly of the housing until the support 40 engages the ring 42. In this operation, the bushing 38 is held stationary by virtue of its press fit in the housing, while the bushing 41 moves to the left with the shaft 36 and support 40 to provide the necessary running clearance between the worm gear 35 and the flanges of the bushings 38 and 41. If desired, the bushing 38 could be positioned in an initial operation independently of the insertion of the shaft 36.

With the shaft positioned in the housing as just described the drive-disks 50 are placed on the shaft, and then the washers 51 and 52, stamping 53, the cultivating elements and the spacing collar 46 are applied, all such latter parts being held in place by the screws 55.

Preferably, a grease-retaining, dust-excluding washer 62 of felt or similar material is interposed between each drive-disk 50 and the base of the counterbore which receives it. If desired for the purpose of further excluding dirt from the gears and bearings, the housing 20 may be provided with an annular groove surrounding each of the counterbores just mentioned, the rim of the cup 53 extending into such counterbore into engagement with a second felt washer 63.

We claim as our invention:

1. An attachment for connection to a machine having a power driven shaft, comprising a unitary housing having an interior cavity, a cross shaft rotatably supported from the housing to extend across said cavity and project beyond at least one side of the housing, a rotary implement mounted in the projecting end of such cross shaft and drivingly connected thereto, a driven gear secured to said cross shaft within said cavity, said housing being provided with an axially elongated passage communicating with said cavity and extending therefrom in a direction transverse to said cross shaft, bearing means secured in said passage, a drive shaft rotatably supported in said bearing means with one of its ends projecting therebeyond into said cavity in the plane of said gear, means acting against said bearings for retaining said drive shaft in fixed position axially of itself relative to said housing, a drive gear slidable on but rotatable with the projecting end of said drive shaft, said housing having in line with and beyond the projecting end of said drive shaft an opening of larger diameter than the drive gear and through which the drive gear can be passed and slid on said drive shaft, releasable means on said drive shaft and accessible through said opening for retaining the drive gear on the drive shaft in meshing engagement with the driven gear, and a removable closure for said opening.

2. An attachment for connection to a machine having a power driven shaft, comprising a housing, a driven shaft rotatably supported on said housing and projecting therefrom, means for transmitting rotative effort to said driven shaft, a clutch disk secured to the outwardly projecting portion of said driven shaft, an earth-working element rotatably mounted on said shaft outwardly beyond said clutch disk, said housing having in its outer face an annular groove surrounding said shaft and of larger diameter than said disk, a cup-like member non-rotatably connected to said earth-working element at the inner side thereof and having an annular flange extending axially into said groove, means seated in said groove and engageable by said flange for preventing the passage of foreign matter into said cup-like member, and friction clutch means drivingly interconnecting said disk and member.

3. An attachment for connection to a machine having a power driven shaft, comprising a unitary housing having an interior cavity, a cross shaft rotatably supported from the housing to extend across said cavity and project beyond at least one side of the housing, a rotary implement mounted in the projecting end of such cross shaft and drivingly connected thereto, a driven worm gear secured to said cross shaft within said cavity, a drive shaft rotatably supported in said housing with one of its ends projecting into said cavity in the plane of said gear, a drive worm slidable on but rotatable with the projecting end of said drive shaft, said housing having in line with and beyond the projecting end of said drive shaft an opening of larger diameter than the drive worm and through which the drive worm can be passed and slid on said drive shaft, releasable means on said drive shaft and accessible through said opening for retaining the drive worm on the drive shaft in meshing engagement with the driven gear, said worm being of such a hand that when it rotates in the implement-driving direction the reaction of the gear against it will urge it axially of itself away from said opening, thrust-bearing means for limiting movement of the worm under the influence of such reaction, and a removable closure for said opening.

References Cited in the file of this patent
UNITED STATES PATENTS

| | | | |
|---|---|---|---|
| 2,438,189 | Seaman | Mar. 23, | 1948 |
| 2,544,461 | Leitzel | Mar. 6, | 1951 |
| 2,683,406 | Kelsey | July 13, | 1954 |
| 2,691,928 | Kelsey et al. | Oct. 19, | 1954 |
| 2,805,611 | Fletchall | Sept. 10, | 1957 |